United States Patent Office 3,241,915
Patented Mar. 22, 1966

3,241,915
PREPARATION OF ANHYDROUS
MAGNESIUM CHLORIDE
Robert J. Moolenaar, Midland, Mich., assignor to The
Dow Chemical Company, Midland, Mich., a corporation of Delaware
No Drawing. Filed Apr. 2, 1964, Ser. No. 356,953
11 Claims. (Cl. 23—91)

This invention relates to magnesium chloride and more particularly concerns a novel process for the preparation of an essentially anhydrous magnesium chloride product from hydrates thereof, having special utility as a cell feed material in the electrolytic production of primary magnesium metal.

One method for producing primary magnesium has long been by electrolysis of fused substantially anhydrous magnesium chloride in electrolytic cells, the metal so-produced being commonly referred to in commerce as electrolytic or cell magnesium. For optimum cell operation, however, magnesium chloride for this purpose must be as free of water as possible since the presence of water in the cell will cause hydrolysis of said magnesium chloride resulting in contamination of the chlorine gas evolved at the cell anode with hydrogen chloride. Furthermore, the effect of the presence of water in the cell tends to raise the terminal voltage therein by fostering the deposition of poorly conducting coatings containing magnesium oxide which also results from the hydrolysis of magnesium chloride. These coatings render the cell less efficient. In addition, other disadvantages result from the presence of water in the cell with respect to relative density of the electrolyte and the molten magnesium product. Similarly a magnesium chloride having as low a magnesium oxide impurity level as possible is also highly desirable. Though as a practical matter, due primarily to the inordinate cost involved in converting hydrated magnesium chloride to the anhydrous state, magnesium chloride having between one and two molecules of combined water has heretofore been tolerated in certain cells. Nevertheless, for a more efficient, economical, and useful cell operation a cell containing a low level of magnesium oxide and an essentially anhydrous magnesium chloride is highly desirable, particularly with respect to the improved electrolytic cell disclosed in the U.S. Patent No. 2,888,389 which desirably requires an anhydrous magnesium chloride-containing electrolyte of a density less than that of the liberated magnesium, having as little water present as possible. Accordingly, high purity relatively inexpensive magnesium chloride, essentially free of water, for use in such cells is a constant existing need.

Magnesium chloride suitable for cell feed may be prepared from, for example, magnesium chloride hexahydrate ($MgCl_2 \cdot 6H_2O$), which is readily commercially available, by the known method of thermal decomposition of said hydrate in a stream of hydrogen chloride gas. This method has the disadvantages attending the use of an acid due to its corrosion and toxic nature, employs elevated temperatures, and in addition, requires recirculation of large amounts of material in an anhydrous atmosphere. Another method of producing anhydrous magnesium chloride is by the thermal decomposition of the double salt, ammonium carnallite

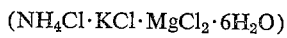

Disadvantages derive from the use of this process also in that elevated temperatures are employed and large amounts of ammonium chloride are required and recycled. Furthermore, said ammonium chloride partially hydrolyzes or decomposes to form hydrogen chloride, thus causing corrosion and handling problems. In addition, in both processes the recycled chemicals (hydrogen chloride and ammonium chloride, respectively) must be dried before being further used.

An object of the present invention, therefore, is to provide a novel method of preparing essentially anhydrous magnesium chloride.

A further object is to provide a simple, efficient, and improved method of producing an essentially anhydrous magnesium chloride cell feed for use in the electrolytic production of primary magnesium having little or no magnesium oxide therein. A related object is to provide such a method free of the attending disadvantages of the prior art methods of preparing anhydrous magnesium chloride.

In general, the above and other objects and advantages have been found obtainable in a process comprising contacting hydrated magnesium chloride crystals with an NN-dialkyl amide as a solvent, such as, for example NN-dimethyl formamide, NN-dimethyl acetamide, and NN-diethyl formamide, to form a solution complex of the two, distilling the resulting solution containing said complex under atmospheric or less than atmospheric pressures to remove essentially all the water therefrom, followed by continued heating preferably in the same vessel at a reduced absolute pressure to heat decompose the complex and drive off, for example, said NN-dimethyl formamide, which may subsequently be recovered, thereby leaving a product of essentially anhydrous magnesium chloride containing substantially no magnesium oxide nor magnesium hydroxy chloride and having a combined water content, for example, of less than about 0.7 percent by weight, and which can be as low as about 0.2 percent. Accordingly, such a substantial anhydrous product is particularly suited for use as a feed material in electrolytic cells in the production of primary magnesium metal.

In practicing the process of the present invention, using, for example, dimethyl formamide as a coordinating solvent, a hydrate of magnesium chloride having up to, for example, 6 moles of combined water per mole of chloride is dissolved in a sufficient amount of said solvent within a molar ratio of solvent-to-magnesium chloride of from about 15 to about 2, thereby forming a solution containing a soluble complex of said solvent and chloride. This solution is then distilled by heating at a temperature depending on the pressure in the distillation vessel, for example, within the range of from about 100° to about 200° C. for a period of time sufficient to extract essentially all the water from said solution, for instance, down to a water level of at least about 0.7 percent based on the $MgCl_2$ present. Preferably said distillation is carried out at atmospheric pressure. In so doing, the magnesium chloride hydrate starting material is rendered essentially completely anhydrous, whereupon, heating of the chloride-dimethyl formamide complex is continued preferably in the same vessel, without benefit of the distillation portion of the apparatus, at a temperature within the range of from about 200° to about 450° C. and at a reduced pressure of less than about 0.1 mm. of Hg absolute, to heat-decompose the complex and drive off the dimethyl formamide, said dimethyl formamide being readily collected, condensed and recycled for use. The final resulting anhydrous magnesium chloride product remaining normally contains less than about 1 percent total of residual carbon, hydrogen and nitrogen, based on the weight of product, thus well within the maximum limit of water and magnesium oxide desired for its use as a cell feed in the electrolytic production of magnesium.

Though the other solvents described herein are also suitable NN-dimethyl formamide is particularly preferred and suited for use in accordance with the present invention inasmuch as it does not react with the magnesium chloride other than to form the desired complex therewith, is recoverable, and is highly stable under the present conditions. A residuum of carbon, hydrogen, and nitrogen of normally less than about 1 percent of the product weight remains in the product.

The present invention, therefore, provides a novel and efficient process for producing a high purity anhydrous magnesium chloride, essentially completely free of the combined water, from the hydrates of said chloride, thus being particularly suited for use as a cell feed in the electrolytic production of primary magnesium, employs a highly stable amide solvent and has the advantage of simplicity and adaptability to batch, cyclic batch, and continuous operations.

The following example serves to more fully illustrate the process of the present invention but are not intended to be construed as limiting it thereto.

EXAMPLE I

About 18.96 grams of magnesium chloride hexahydrate ($MgCl_2 \cdot 6H_2O$) was dissolved in 102 grams of N,N-dimethyl formamide, referred to herein as DMF, whereupon a complex of the two components was formed in solution. The resulting solution complex was placed in a 250 ml. distilling pot attached to a distillation column and heated at atmospheric pressure to drive off the water from said solution at a reflux ratio of 1 to 1. The temperature at the take-off point above the column varied between 100° and about 170° C. depending on the water concentration with respect to said DMF. Progressively, as greater water and DMF amounts were removed by distillation the composition of the solution in the still pot was determined at 3 levels, indicated as samples 1 through 3 in Table I, and in so doing, consumed, with respect to both the water content in the remaining solution and on the basis of 100 percent magnesium chloride therein as compared to the initial solution composition.

Thereafter, 100 grams of a solution identical to sample C was made up and evacuated in a vessel and slowly heated, whereupon, after about 3 hours, the temperature having reached 450° C., heating was discontinued and the solid residue of $MgCl_2$ allowed to cool. The product analyzed as follows:

| | Percent |
|---|---|
| Carbon | 0.65 |
| Nitrogen | 0.10 |
| Hydrogen | 0.30 |
| MgO | |
| MgOHCl | |
| Water | 0.16 |
| $MgCl_2$ | Balance |

In addition, when the product was analyzed by X-ray diffraction, only the lines characteristic of anhydrous magnesium chloride were shown.

Table I

| Sample | Percent DMF removed by distillation | $H_2O$ content, wt. percent— of Sol'n $MgCl_2$+DMF | on 100% $MgCl_2$ basis |
|---|---|---|---|
| Initial | 0 | 8.2 | 53 |
| A | 14 | 0.045 | 0.49 |
| B | 25 | 0.036 | 0.35 |
| C | 37 | 0.0197 | 0.16 |

EXAMPLE II

In a manner similar to that described in Example I above, a magnesium chloride hydrate may also be dissolved in N,N-dimethyl acetamide, or N,N-diethyl amide, as a coordinating solvent, to form a complex in solution of said chloride and solvent, followed by distillation and heating to prepare a substantially anhydrous magnesium chloride product useful, for example, as a cell feed in the electrolytic production of primary magnesium.

From the foregoing it is readily apparent that by means of the novel and simple process of the present invention an essentially anhydrous magnesium chloride product may be prepared having particular utility as a feed material in electrolytic cells for use in producing primary magnesium. The magnesium chloride product produced by the present process, of course, is also adapted for other uses wherein anhydrous magnesium chloride may be required.

The process of the present invention can be modified and changed without departing from the spirit or scope thereof and it is understood that I limit myself only as defined in the appended claims.

I claim:

1. A method of preparing a substantially anhydrous magnesium chloride from hydrated magnesium chloride which comprises the steps of, contacting said hydrate with an NN-dialkyl amide as a solvent in an amount of said solvent at least sufficient to dissolve the hydrate, thereby to form a complex of magnesium chloride and said amide solvent in solution, distilling said solution to drive off and remove essentially all the water therefrom, and heating the solution so distilled under a reduced pressure and at a temperature within the range of from about 200° to about 450° C. to decompose said complex and drive off the solvent, thereby preparing a substantially anhydrous magnesium chloride product.

2. The method of claim 1 wherein the solvent is NN-dimethyl formamide.

3. The method of claim 1 wherein the solvent is NN-diethyl formamide.

4. The method of claim 1 wherein the solvent is NN-dimethyl acetamide.

5. The method of claim 1 wherein the amount of solvent to magnesium chloride hydrate used is within a molar ratio by weight of from about 2:1 to about 15:1.

6. The method of claim 1 wherein the distillation is carried out at atmospheric pressure.

7. The method of claim 1 wherein the distillation is carried out at less than atmospheric pressure.

8. The method of claim 1 wherein the heating is accomplished at a reduced pressure of less than about 0.1 mm. of Hg, absolute.

9. The method of claim 1 wherein the anhydrous magnesium chloride product is prepared initially from magnesium chloride hexahydrate.

10. A method of preparing essentially anhydrous magnesium chloride from magnesium chloride hexahydrate which comprises the steps of, dissolving said hydrate with an amount of NN-dimethyl formamide in a molar ratio by weight to said hydrate within the range of from about 2:1 to about 15:1 thereby to form a complex of magnesium chloride and said NN-dimethyl formamide in solution, distilling said solution at atmospheric pressure to drive off and remove essentially all the water therefrom, and heating the solution so distilled under a reduced pressure of less than that about 0.1 mm. of Hg, absolute, at a temperature within the range of from about 200° to about 450° C. to decompose said complex and drive off said NN-dimethyl formamide, thereby preparing an essentially anhydrous magnesium chloride product.

11. A method of preparing essentially anhydrous magnesium chloride from magnesium chloride hexahydrate which comprises the steps of, dissolving said hydrate with an amount of NN-dimethyl acetamide in a ratio by weight to said hydrate within the range of from about 2 to about 15, thereby to form a complex of magnesium chloride and said NN-dimethyl acetamide in solution, distilling said solution at atmospheric pressure to drive off and remove essentially all the water therefrom, and heating the solution so distilled under a reduced pressure of less than that about 0.1 mm. of Hg, absolute, at a temperature within the range of from about 200° to about 450° C. to decompose said complex and drive off said NN-dimethyl acetamide, thereby preparing a substantially anhydrous magnesium chloride product.

References Cited by the Examiner

UNITED STATES PATENTS

| | | | |
|---|---|---|---|
| 2,381,994 | 8/1945 | Belchetz | 23—91 |
| 2,381,995 | 8/1945 | Belchetz | 23—91 |
| 3,092,450 | 6/1963 | Christensen | 23—91 |

MAURICE A. BRINDISI, *Primary Examiner.*